Feb. 16, 1943.     C. L. HASTINGS     2,311,387
LIQUID LEVEL GAUGE
Filed Oct. 13, 1941
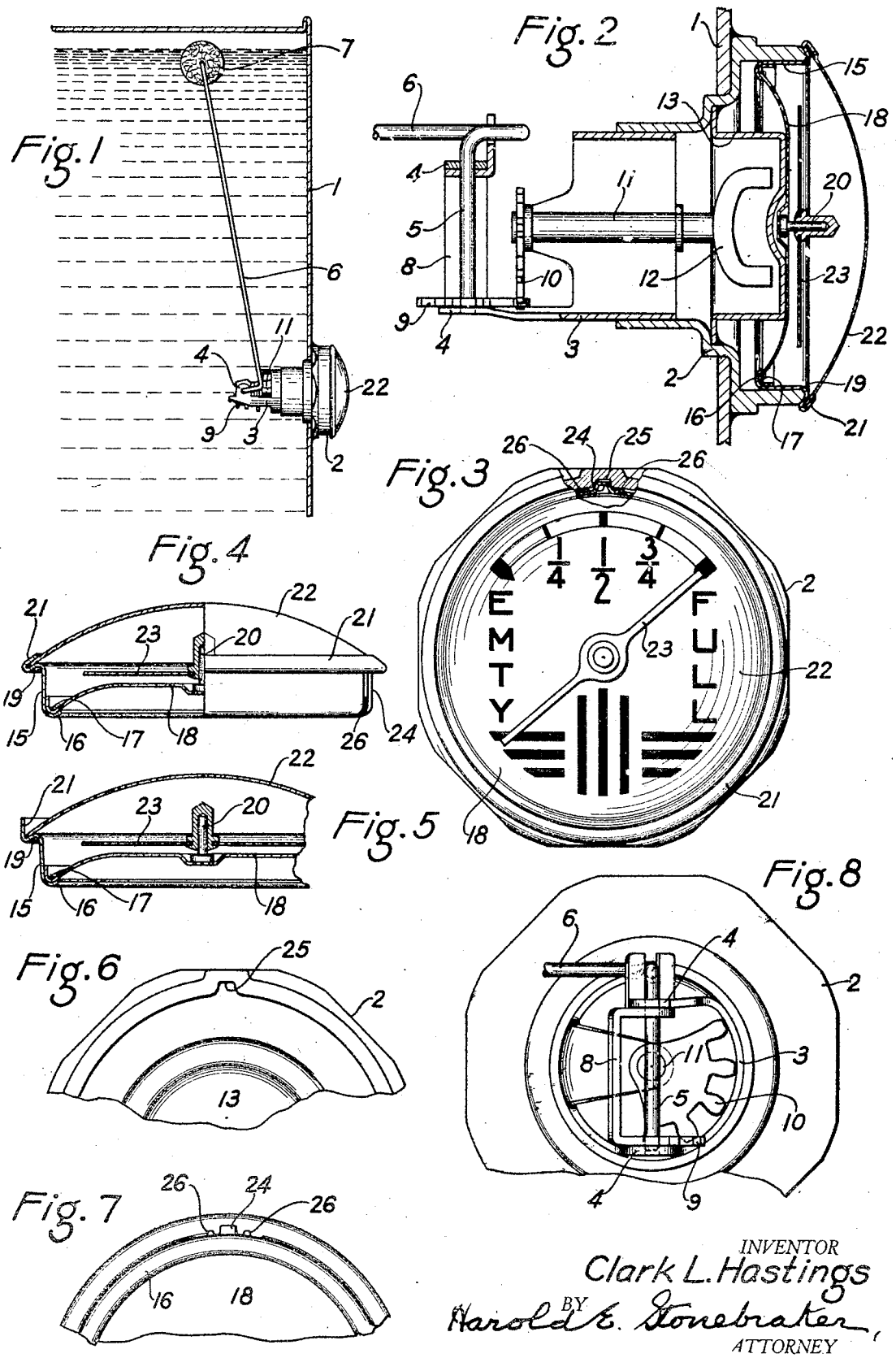
INVENTOR
Clark L. Hastings
BY Harold E. Stonebraker
ATTORNEY Patented Feb. 16, 1943

2,311,387

UNITED STATES PATENT OFFICE 2,311,387

LIQUID LEVEL GAUGE

Clark L. Hastings, Brighton, N. Y., assignor to Rochester Manufacturing Co., Inc., Rochester, N. Y., a corporation of New York Application October 13, 1941, Serial No. 414,711

5 Claims. (Cl. 73—317)

This invention relates to a liquid level gauge, with more particular reference to the type of construction employed in connection with kerosene and other liquid-containing tanks for indicating the level of liquid through the instrumentality of float-operated mechanism secured in an opening in the tank, and it has for its object to afford a construction that avoids the objections existing with prior gauges resulting from the dial and crystal being permanently built into the gauge and therefore necessarily positioned on the tank when the gauge assembly is attached.

The invention is intended for use principally for gauges which are held and sealed in a tank by soldering. The heating of the tank and gauge head by a soldering iron causes discoloration of the dial and in some instances burns the Celluloid crystal, due to the fact that the soldering heat cannot be closely controlled. A soldered type gauge eliminates the need of a threaded flange and threaded connection on the gauge which are costly in comparison with a simple perforated hole in the tank and a gauge housing that is soldered therein, and it is a purpose of the invention to attain this objective without the danger of discoloration of the dial, burning of the Celluloid crystal, or otherwise damaging any of the parts as a result of the soldering operation.

Owing to the necessity of soldering the gauge housing in position on the tank before the latter is painted, considerable difficulty is experienced due to oven treatment after painting the tank, such as discoloration of the dial and distortion of the Celluloid crystal while in the baking oven, while the finish on the bezel was costly and of limited selection in order to withstand the heat-treatment of the finish on the tank. Damage has also resulted from stacking the tanks one upon another in shipment, permitting the wall of one tank to strike the crystal and bezel of an adjacent tank and break or bend these parts, and it is a purpose of the invention to eliminate these difficulties by providing a gauge in which the dial, indicator, and crystal are mounted in suitable supporting means that is attachable as a separate unitary assembly to the housing containing the usual operating magnet and float actuating mechanism.

In a more particular aspect, the invention has for its object to afford a structure in which a housing carrying the magnet and float actuating mechanism may be soldered to a tank and the latter painted and subjected to the usual oven baking before assembling the dial, indicator, and crystal which are part of an independent unit that is attachable in operative position in the housing after the tank is painted and preferably after it is placed in operative position.

Another purpose of the invention is to afford a simple, practical and economical construction embracing supporting means in the form of a bezel that is readily attachable within a housing and removable therefrom if necessary, the bezel being provided with a dial and crystal which are permanently attached thereto with the usual indicator mounted on the dial.

Still a further purpose of the invention is to afford a construction of the type mentioned in which the dial and crystal unit assembly can be quickly and readily positioned within and firmly attached to the housing or removed therefrom if necessary for replacement, the structure affording a neat and attractive appearance and lending itself to the use of any desired finish on the bezel and dial or any kind of crystal, since these parts are not assembled in the gauge housing until the painting and oven baking operations of the tank are completed.

Another object of the invention is to enable the use of a dial of aluminum or other non-magnetic material mounted or housed within a steel bezel, thus eliminating the necessity of making the larger parts of the more costly aluminum or brass, and permitting the use of steel for the bezel and so reducing the cost of production.

An additional object of the invention is to afford an inexpensive and simple form of bezel that lends itself efficiently to supporting the dial at its inner edge and the crystal at its outer portion.

To these and other ends, the invention consists in the construction and arrangement of parts that will appear clearly from the following description when read in conjunction with the accompanying drawing, the novel features being pointed out in the claims following the specification.

In the drawing:

Fig. 1 is a view in side elevation showing a preferred embodiment of the invention in operative position on a tank, with the float in its uppermost position;

Fig. 2 is an enlarged longitudinal sectional view taken centrally through the gauge, with parts appearing in elevation, and the float rod broken away;

Fig. 3 is a front elevation of the structure with parts broken away to show in section the interlocking connection between the bezel and housing;

Fig. 4 is a side elevation, partially in section, of the separate unit assembly of dial, indicator, and crystal;

Fig. 5 is a similar view showing the position of the bezel before the crystal is secured in place;

Fig. 6 is a plan view of the housing with the bezel removed;

Fig. 7 is a bottom plan view of the dial and bezel, and

Fig. 8 is a bottom plan view of the gauge, showing the operating mechanism, with the float rod broken away.

Referring more particularly to the drawing in which like reference numerals refer to the same parts throughout the several views, 1 designates a tank provided with a suitable opening to receive the housing 2 that is soldered within the opening in the tank, as usual in this type of construction. The housing 2 carries a permanently attached sleeve 3 having ears 4 which afford a bearing for the transverse pivotal portion 5 at the inner extremity of the float rod 6, carrying the usual float 7, and 8 is a yoke carried by the transverse pivotal portion 5, and including a gear segment 9 that engages and operates a gear segment 10 mounted on the arbor 11. The arbor 11 carries at its outer end the operating magnet 12 which when rotated actuates the magnetized indicator or pointer over the scale, as usual in this type of device. 13 designates a closure secured within the housing 2 over the magnet 12 and sealed pressure-tight by soldering. The parts thus far described are of more or less conventional form, and the construction will now be described which has to do with forming the dial, indicator, and crystal as a separate, independent, unitary assembly that is attachable within the housing, or removable therefrom when occasion demands.

In prior constructions of gauges of this general character, the dial and crystal have been permanently secured to the housing, necessitating their location in the housing while the latter is soldered in the tank, and before painting and heat-treating the latter, whereas in the present structure, the dial, crystal, and indicator are carried by suitable supporting means, affording a separate assembly that is removably positionable and attachable within the housing.

To accomplish this, there is provided supporting means for the dial and crystal that is readily positionable within the housing and attachable thereto. The supporting means preferably embodies a bezel including an annular portion 15 having an inwardly turned curved flange 16 at its inner edge that affords a seat for the curved rim 17 at the outer edge of the dial 18 which is formed of aluminum, brass, or other non-magnetic material and may be sprung into position and held frictionally within the bezel against the flange 16. At its outer edge the bezel is provided with an outwardly turned portion 19 arranged to overlie the outer edge of the annular portion of the housing 2, as shown in Fig. 2, and 21 is a flange that is rolled over the crystal 22 in the manner shown in Fig. 2 to retain the latter in place after it is positioned against the outwardly turned portion 19, as shown in Fig. 1. Thus the bezel permanently retains the dial 18 and the crystal 22, which latter may be of Celluloid or other suitable transparent material, while 23 designates the magnetized pointer or indicator movable on a bearing 20 that is suitably mounted on the dial 18.

There is thus provided a separate and independent unitary assembly comprising the dial, crystal, and indicator, all mounted in a supporting means or bezel which is positionable within and attachable to the housing, and removable therefrom if occasion demands, for replacement in case any of these parts become damaged.

To secure the bezel within the housing, and to position it accurately in relation thereto, the bezel is provided with a projection or key 24 engageable with a groove or keyway 25 in the housing, while 26 designates ribs formed in the bezel on opposite sides of the key 24 and acting to engage frictionally the adjacent surface of the housing and thus retain the bezel therewithin.

With this construction, the housing 2 carrying the float rod, operating mechanism, and magnet, is soldered within the tank 1, and the latter can then be painted and heat-treated without the possibility of damage to the crystal, dial or bezel since these parts need not be assembled in the housing until the painting and heat-treating operations on the tank are completed and preferably until the tank is placed in its final operative position.

The bezel carrying the dial, indicator, and crystal, is then located within the housing by first bringing the key 24 into registry with the keyway or groove 25 and then forcing the bezel inwardly of the housing until it assumes the position shown in Fig. 2 with the dial against the cover plate 13 and the outer portion 19 of the bezel resting upon the outer edge of the annular portion of the housing. The bezel is retained in the housing in operative position against accidental displacement by frictional engagement between the ribs 26 and the adjacent surface of the housing. In case of breakage or damage of the crystal or of any parts within the bezel, the assembly can be removed by inserting a suitable tool under the portion 19 and forcing it outwardly, and a new dial, indicator, and crystal unit may be inserted.

While the invention has been described with reference to the embodiment disclosed, it is not confined to the details shown, and this application is intended to cover any modifications or departures that may come within the purposes of the improvement or the scope of the following claims.

I claim:

1. In a liquid level gauge, the combination with a housing carrying an operating magnet and float mechanism, of a closure extending over the magnet and sealed within the housing, a unitary assembly removably attachable to the housing and comprising supporting means, a crystal and dial carried thereby, a bearing carried by the dial, the dial and bearing being separated from the magnet by said closure, and an indicator on the bearing.

2. In a liquid level gauge, the combination with a housing carrying an operating magnet and float mechanism, of a closure extending over the magnet and sealed within the housing, annular supporting means removably attachable within the housing over said closure, a dial, and a crystal carried by said supporting means, a bearing carried by said dial, and an indicator mounted on said bearing, the dial and bearing being separated from the magnet by said closure.

3. In a liquid level gauge, the combination with a housing carrying an operating magnet and float mechanism and including an annular wall, of a closure extending over the magnet and sealed within the housing, a supporting bezel removably positionable against said wall interiorly thereof over said closure, said bezel having an outwardly turned portion overlying the outer edge of said annular wall, a crystal positioned against said outwardly turned portion, the bezel having an inwardly rolled flange engaging said crystal, an inwardly curved flange at the inner edge of the bezel forming a seat, a dial having a curved outer edge resting in said seat and held frictionally by the bezel, a bearing carried by said dial, and an indicator mounted on said bearing, the dial and bearing being separated from the magnet by said closure.

4. In a liquid level gauge, the combination with a housing carrying an operating magnet and float mechanism and including an annular wall, of a closure extending over the magnet and sealed within the housing, a supporting bezel removably positionable against said wall interiorly thereof over said closure, said bezel having an outwardly turned portion overlying the outer edge of said annular wall, a crystal positioned against said outwardly turned portion, the bezel having an inwardly rolled flange engaging said crystal, an inwardly curved flange at the inner edge of the bezel forming a seat, a dial having a curved outer edge resting in said seat and held frictionally by the bezel, a bearing carried by the dial, an indicator mounted on said bearing, the annular wall and bezel having interengaging registering means, and projecting means on opposite sides of said registering means on one of said parts engaging the adjacent surface of the other and retaining the bezel frictionally in the housing.

5. In a liquid level gauge, the combination with a housing carrying an operating magnet, of a closure extending over the magnet and sealed within the housing, a unitary dial assembly removably attachable within said housing and including an annular steel bezel, a crystal supported by the bezel, a dial of non-magnetic material supported by the bezel, a bearing carried by the dial, and an indicating pointer mounted on said bearing, the dial and bearing being separated from the magnet by said closure.

CLARK L. HASTINGS.